United States Patent [19]

Omata

[11] Patent Number: 5,542,057
[45] Date of Patent: Jul. 30, 1996

[54] METHOD FOR CONTROLLING VECTOR DATA EXECUTION

[75] Inventor: Makoto Omata, Yamanashi, Japan

[73] Assignee: NEC Corporation, Tokyo, Japan

[21] Appl. No.: 199,973

[22] Filed: Feb. 22, 1994

Related U.S. Application Data

[63] Continuation of Ser. No. 665,274, Mar. 6, 1991, abandoned.

[30] Foreign Application Priority Data

Mar. 8, 1990 [JP] Japan ..................................... 2-57081

[51] Int. Cl.$^6$ ..................................... G06F 13/14
[52] U.S. Cl. .................... 395/375; 395/800; 364/DIG. 1
[58] Field of Search ..................................... 395/375, 800

[56] References Cited

U.S. PATENT DOCUMENTS

| | | | |
|---|---|---|---|
| 4,128,880 | 12/1978 | Cray, Jr. ................................. | 364/200 |
| 5,127,093 | 6/1992 | Moore, Jr. ............................. | 395/375 |
| 5,185,872 | 2/1993 | Arnold et al. ......................... | 395/375 |

*Primary Examiner*—William M. Treat
*Attorney, Agent, or Firm*—Foley & Lardner

[57] ABSTRACT

An information processing apparatus includes an arithmetic operation executing unit, a memory unit, a memory control unit, a resource managing unit, and an execution designating unit. The arithmetic operation executing unit executes an arithmetic operation on the basis of an instruction. The memory unit stores the arithmetic operation result from the arithmetic operation executing unit. The memory control unit has a buffer for temporarily storing data from the arithmetic operation executing unit and controls data transfer between the arithmetic operation executing unit and the memory unit. The resource managing unit manages use states of resources of the arithmetic operation executing unit. When an instruction is a data store instruction, the execution designating unit sends a buffer holding request to the memory control unit regardless of the resource state of the arithmetic operation executing unit. When a buffer holding response is supplied from the memory control unit, the execution designating unit designates execution of the data store instruction to the arithmetic operation executing unit and the memory control unit on the basis of management information from the resource managing unit.

11 Claims, 3 Drawing Sheets

(1) VADD  V2 ← V0+V1
(2) VST   M  ← V2
(3) VMPY  V4 ← V2∗V3
FIG.3A
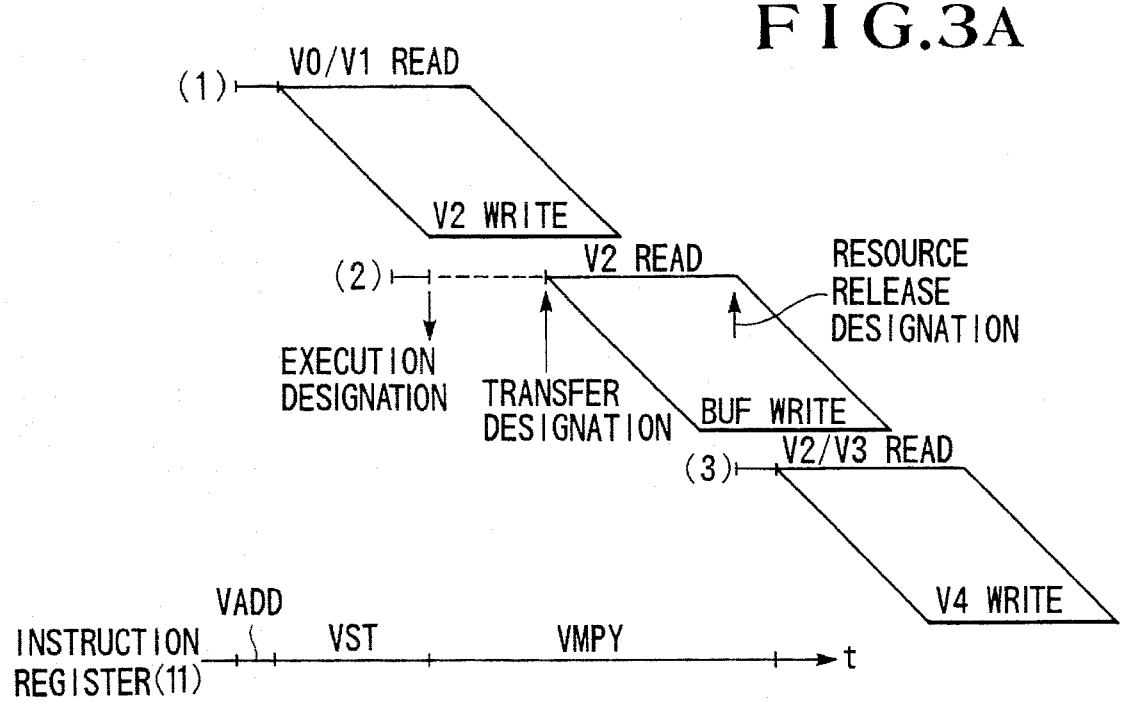
FIG.3B
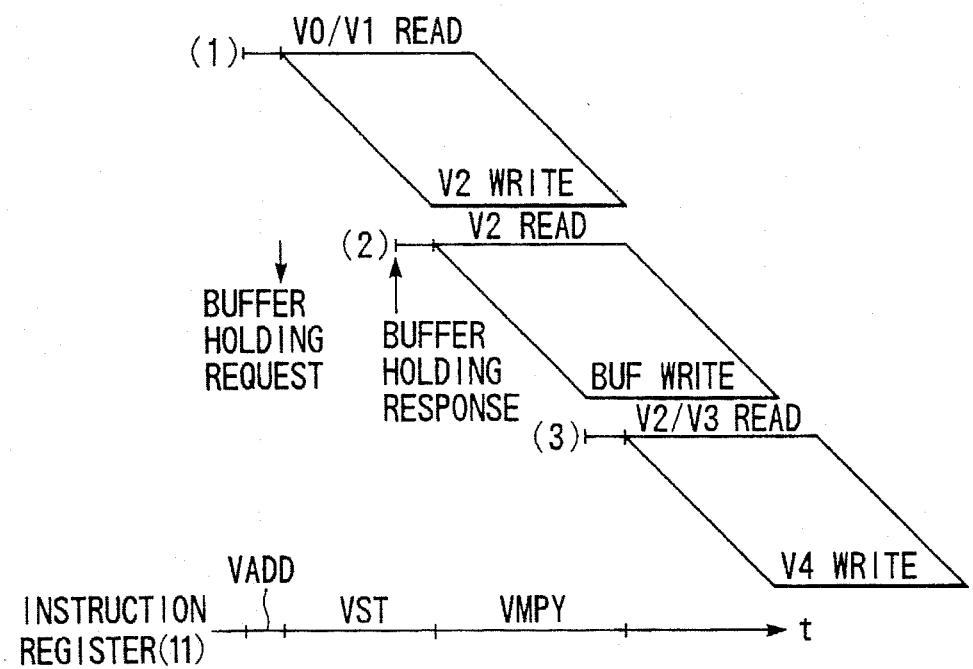
FIG.3C

METHOD FOR CONTROLLING VECTOR DATA EXECUTION

This application is a continuation of application Ser. No. 07/665,274, filed Mar. 6, 1991, now abandoned.

BACKGROUND OF THE INVENTION

The present invention relates to an information processing apparatus and, more particularly, to an information processing apparatus for performing control of a vector store instruction used in vector processing.

A conventional information processing apparatus will be described below with reference to FIG. 2. Referring to FIG. 2, this conventional information processing apparatus comprises an instruction register 11 for storing instructions, a decoding/checking circuit 12 for decoding an instruction from the register 11. It also comprises a resource managing means 13 for monitoring the use state of a vector register having data to be stored and acknowledging to the decoding/checking circuit 12 that the vector register is readable, when the decoded instruction is determined to be a vector store instruction.

On the basis of the acknowledgement from the resource managing means 13, the decoding/checking circuit 12 sends a vector store instruction execution designation signal to a line 53. A memory control unit 3 has a buffer 32 connected to a memory unit 4 and a path 6 for connecting the buffer 32 to an arithmetic operation executing unit 2.

In response to the vector store instruction execution designation signal, a buffer managing means 31 and a path managing means 33 in the control unit 3 check the use state of the buffer 32 and of the path 6. When the buffer 32 and the path 6 are set in a data transfer enable state, the memory control unit 3 sends a data transfer designation signal to the arithmetic operation executing unit 2 through a line 7. In response to this data transfer designation signal, the arithmetic operation executing unit 2 starts transferring elements to be stored from the vector register to the buffer 32.

When this data transfer is finished, the memory control unit 3 sends a resource release designation signal to the resource managing means 13 through a line 8. This resource release designation signal indicates the end of use of the stored vector register.

Practical instructions used in an information processing apparatus of this type for executing vector processing will be described in detail with reference to FIG. 3A.

Referring to FIG. 3A, (1) VADD V2←V0+V1 is a vector addition instruction, for adding data indicated by the contents of vector registers V0 and V1 in units of elements and storing the sum in a vector register V2.

(2) VST M←V2 is a vector store instruction, for storing data indicated by the contents of the vector register V2 in the memory unit 4. Vector Register V2 has stored the sum resulting from the vector addition instruction VADD indicated by (1) above.

(3) VMPY V4←V2*V3 is a vector multiplication instruction, for multiplying data indicated by the contents of vector registers V2 and V3 in units of elements and storing the product in a vector register V4.

An operation of a conventional information processing apparatus using the above instructions will be described below with reference to FIGS. 2 and 3B.

Referring to FIGS. 2 and 3B, when the vector addition (VADD) instruction is stored in the instruction register 11, the resource managing means 13 checks the use states of the vector registers V0 and V1, having data to be read out in accordance with the VADD instruction, and that of the vector register V2, for storing the sum. If the registers are not being used, the decoding/checking circuit 12 sends a VADD instruction execution designation signal to the arithmetic operation executing unit 2, and the resource managing means 13 is informed of the use of the vector registers V0, V1, and V2. The resource managing means 13 sets the registers V0, V1, and V2 in a usable state when a predetermined time period has elapsed.

Subsequently, when the vector store (VST) instruction is supplied to the register 11, the resource managing means 13 checks the use state of the vector register V2 having data to be read out in accordance with the vector store (VST) instruction. When the register V2 becomes usable, the decoding/checking means 12 sends a VST instruction execution designation signal to the arithmetic operation executing unit 2 and the memory control unit 3 through the line 53, and the resource managing means 13 is informed of the use of the vector register V2. At this time, the managing means 13 indicates that the register V2 is being used. In response to the VST instruction execution designation signal, the buffer managing means 31 of the memory control unit 3 checks the use state of the buffer 32, and the path managing means 33 checks the use state of the data path 6.

If the two means 31 and 33 determine that the buffer and the path are in a usable state, a data transfer designation signal is sent to the arithmetic operation executing unit 2 through the line 7. In response to this data transfer designation signal, the arithmetic operation executing unit 2 starts transferring data of the vector register V2 to the buffer 32 when a predetermined time period has elapsed. When the transfer is finished, the memory control unit 3 sends a resource release designation signal to the resource managing means 13 through the line 8. In response to the resource release designation signal, the managing means 13 changes the use state designation of the vector register V2 used in accordance with the vector store (VST) instruction to be "usable".

Subsequently, when the vector multiplication (VMPY) instruction is stored in the instruction register 11, the resource managing means 13 checks the use states of the registers V2, V3, and V4 to be used in accordance with the VMPY instruction. If the registers are in a usable state, the circuit 12 sends a VMPY instruction execution designation signal to the arithmetic operation executing unit 2.

In this information processing apparatus, the memory control unit 3 controls a timing of starting data transfer performed in accordance with the vector store instruction by the arithmetic operation executing unit 2 with respect to a vector register having data to be stored. Since, therefore, a timing at which the memory control unit 3 sends a transfer designation signal to the arithmetic operation executing unit 2 is unknown, the execution designation control unit 1 must check the use state of a vector register having data to be stored and confirm that the resource is usable before sending an execution designation signal.

In addition, a time period of using a vector register in accordance with the vector store instruction is not predetermined from the generation timing of execution designation. If, therefore, an instruction using the same vector register is present after the vector store instruction, this instruction must be issued after the memory control unit 3 sends a resource release designation signal. As a result, the entire processing is delayed before and after the vector store instruction.

SUMMARY OF THE INVENTION

It is, therefore, a principal object of the present invention to provide an information processing apparatus capable of shortening an instruction executing time.

It is another object of the present invention to provide an information processing apparatus capable of issuing a subsequent instruction at an early timing.

In order to achieve the above objects of the present invention, there is provided an information processing apparatus comprising arithmetic operation executing means for executing an arithmetic operation on the basis of an instruction. Also comprised is a memory means for storing the arithmetic operation result from the arithmetic operation executing means, and a memory control means, having a buffer for temporarily storing data from the arithmetic operation executing means, for controlling data transfer between the arithmetic operation executing means and the memory means. Also included is a resource managing means for managing use states of resources of the arithmetic operation executing means. Additionally there is an execution designating means for sending, when an instruction is a data store instruction, a buffer holding request to the memory control means regardless of the resource state of the arithmetic operation executing means, and, when a buffer holding response is supplied from the memory control means, designating execution of the data store instruction to the arithmetic operation executing means and the memory control means on the basis of management information from the resource managing means.

BRIEF DESCRIPTION OF THE DRAWINGS

FIG. 3A is a view showing practical instructions;

FIG. 3B is a timing chart for explaining an operation of the prior art; and

FIG. 3C is a timing chart for explaining an operation of the embodiment of the present invention.

DETAILED DESCRIPTION OF THE PREFERRED EMBODIMENT

An embodiment of the present invention will be described in detail below with reference to the accompanying drawings.

Figure 1:
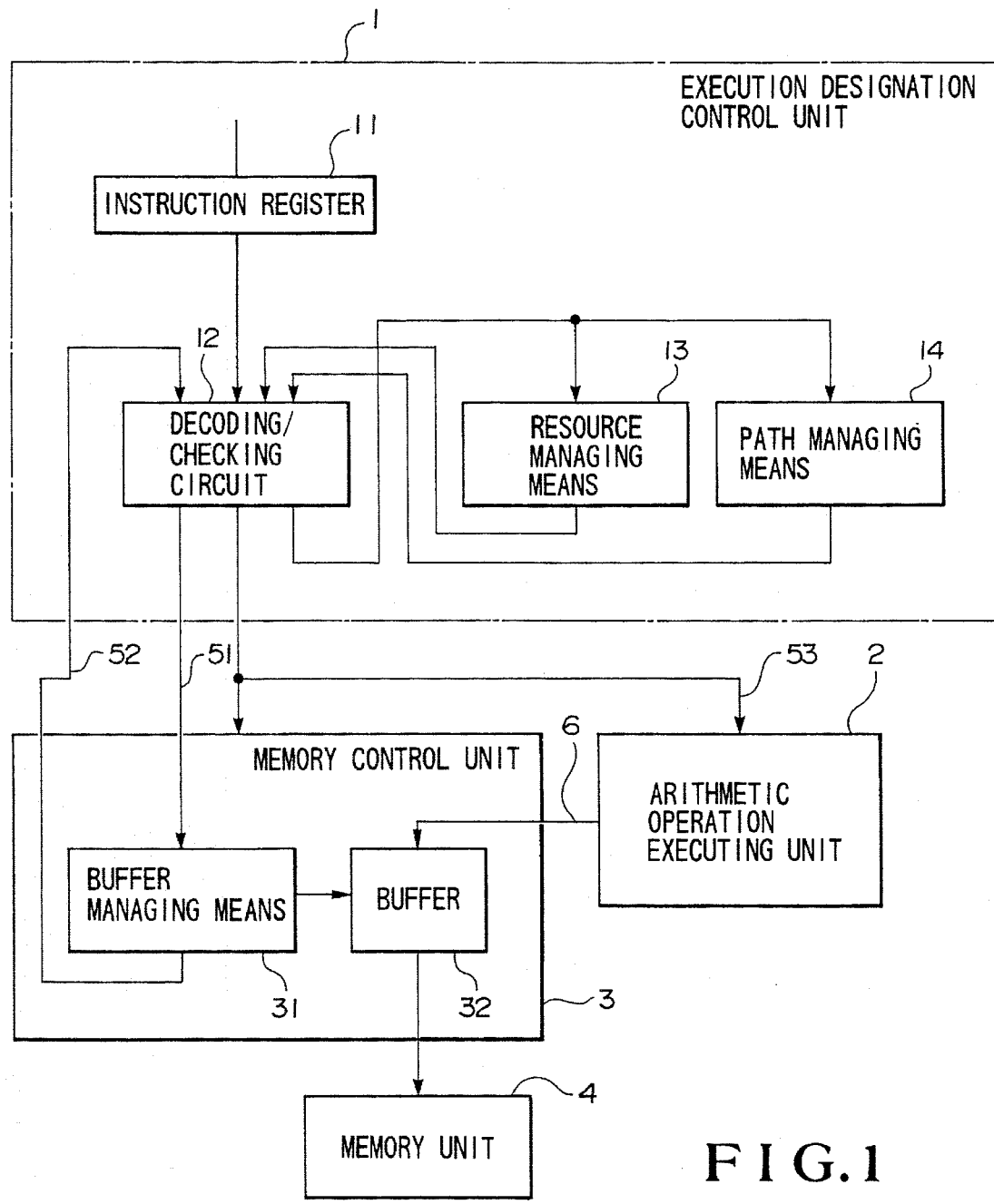
FIG. 1 is a block diagram showing an arrangement of an embodiment of the present invention.
Figure 2:
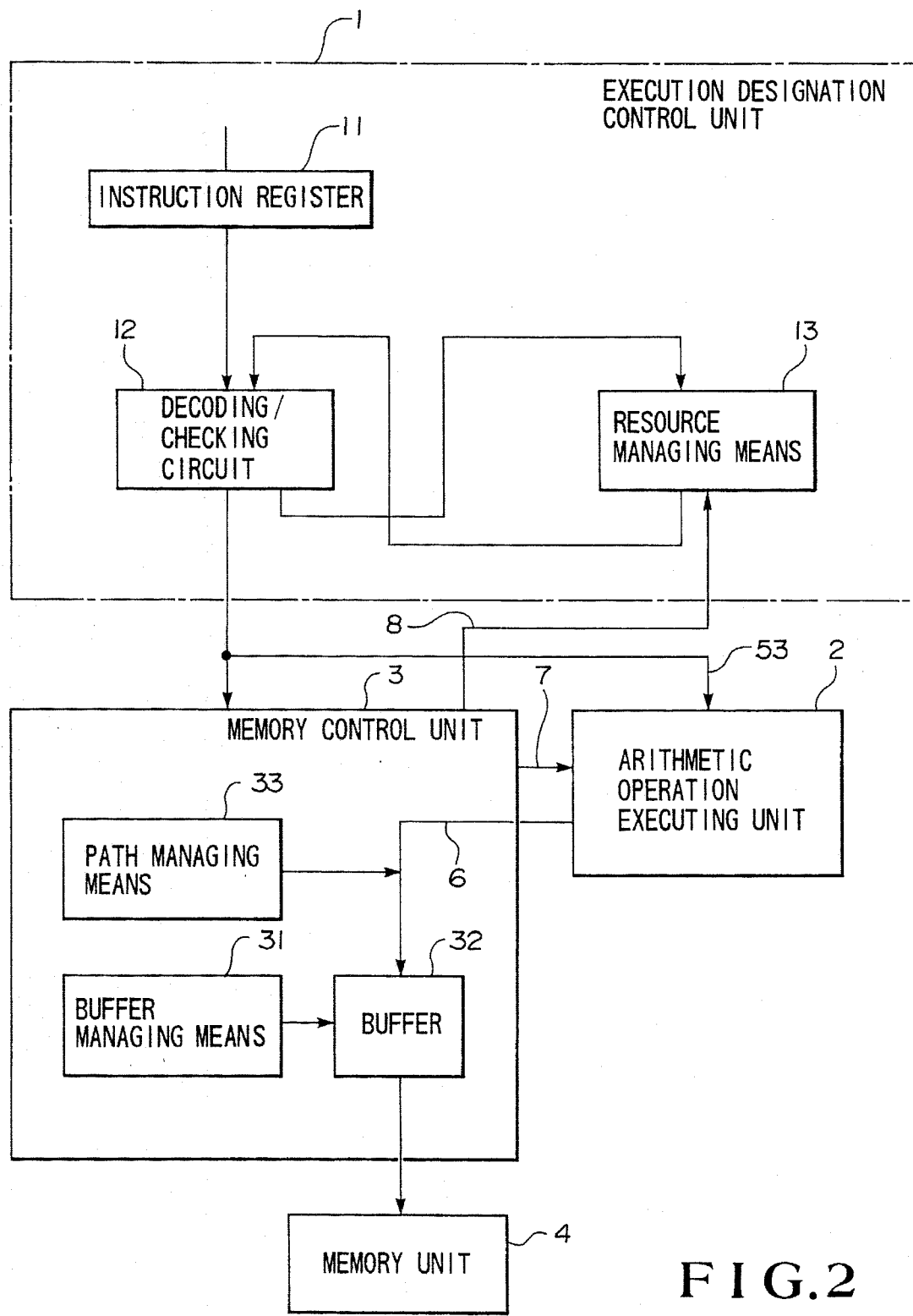
FIG. 2 is a block diagram showing an arrangement of a prior art.

Referring to FIGS. 1 and 3C, the embodiment of the present invention comprises a memory unit 4 for storing data, an arithmetic operation executing unit 2 for executing a vector arithmetic operation, a memory control unit 3 for controlling data transfer between the arithmetic operation executing unit 2 and the memory unit 4, and an execution designation control unit 1 for decoding instructions, managing resource states of the arithmetic operation executing unit 2, and sending an execution designation signal to the memory control unit 3 and the arithmetic operation executing unit 2.

The execution designation control unit 1 includes an instruction register 11 for holding an instruction to be executed, a resource managing means 13 for managing the use states of resources of the arithmetic operation executing unit 2, a path managing means 14 for managing the use state of a data path 6 between the arithmetic operation executing unit 2 and the memory control unit 3, and a decoding/checking circuit 12 as one characteristic feature of the embodiment of the present invention.

The memory control unit 3 includes a buffer 32 for storing data transferred between the arithmetic operation executing unit 2 and the memory unit 4, and a buffer managing means 31 as another characteristic feature of the embodiment of the present invention.

A relationship between the characteristic parts of the embodiment of the present invention will be described in detail below. If the decoding/checking circuit 12 decodes and determines that an instruction stored in the instruction register 11 is a vector store instruction, it sends a buffer holding request to the buffer managing means 31 of the memory control unit 3 through a line 51, regardless of the use state of a vector register to be used by the instruction. The instruction register 11 holds the vector store instruction until the decoding/checking circuit 12 receives a buffer holding response sent through a line 52 in correspondence with the request.

Upon reception of the buffer holding request from the decoding/checking circuit 12 through the line 51, the buffer managing means 31 checks the buffer 32. If a capacity capable of executing the vector store instruction is available, the buffer managing means 31 assures this capacity and sends the buffer holding response to the circuit 12 through the line 52.

Upon reception of the buffer holding response, the decoding/checking circuit 12 checks the use state of the vector register supplied from the resource managing means 13 and that of the data path 6 supplied from the path managing means 14. If the decoding/checking circuit 12 determines that the vector register is usable and the path 6 is empty, the circuit 12 sends a vector store instruction execution designation signal to the arithmetic operation executing unit 2 and the memory control unit 3 through a line 53. In response to the execution designation signal, the arithmetic operation executing unit 2 sends data from the vector register to the buffer 32 through the data path 6 when a predetermined time period has elapsed. The memory control unit 3 stores the data sent through the data path 6 in the buffer 32.

An operation of the embodiment of the present invention using the instructions shown in FIG. 3A will be described in detail below with reference to the accompanying drawings.

Referring to FIGS. 1, 3A, and 3C, when a vector addition (VADD) instruction is stored in the instruction register 11, the resource managing means 13 checks the use states of vector registers V0 and V1, storing input data to be subjected to vector addition, and that of a vector register V2, for storing the sum.

If the registers V0, V1, and V2 are usable, the decoding/checking circuit 12 sends a vector addition (VADD) execution designation signal to the arithmetic operation executing unit 2. On the basis of this execution designation signal, the arithmetic operation executing unit 2 reads out the data from the vector registers V0 and V1, and writes the sum data in the vector register V2 when a predetermined time period has elapsed.

Upon sending of the execution designation, the decoding/checking circuit 12 informs the resource managing means 13 of the use of the vector registers V0, V1, and V2. In response to this information, the resource managing means 13 sets the vector registers V0, V1, and V2 in a currently-being-used state, and sets them in a usable state when a predetermined time period has elapsed.

After the VADD instruction execution designation signal is sent, a vector store (VST) instruction is set in the instruction register 11. Upon being set, a write operation to be executed by the VADD instruction as a preceding instruction has not yet been started for the vector register V2, having the data to be read out by the VST instruction. The circuit 12, however, sends a buffer holding request to the memory control unit 3 through the line 51.

In accordance with this request, the buffer managing means 31 holds the buffer 32 and sends a buffer holding response to the circuit 12 through the line 52. On the basis of this buffer holding response, the decoding/checking circuit 12 checks the use state of the register V2, having the data to be read out by the VST instruction, supplied from the resource managing means 13 and that of the data path 6, supplied from the path managing means 14.

If the decoding/checking circuit 12 determines that a timing of starting the write operation for the vector register V2 according to the vector addition (VADD) instruction is determined, or that the write operation is already started and the data path is in a non-used state or at an end-of-use timing, the circuit 12 sends a VST instruction execution designation signal to the arithmetic operation executing unit 2 and the memory control unit 3 through the line 53. In addition, the circuit 12 sends an acknowledge to the resource managing means 13 to display that the vector register V2, as an object to be used by the VST instruction, is being subjected to a read operation and sends an acknowledge to the path managing means 14 to display that the path 6, as an object to be used by the VST instruction, is being used.

When a predetermined time period has elapsed after the execution designation is acknowledged, the resource managing means 13 changes the display indicating that the vector register V2 is being subjected to a read operation to a display indicating that the vector register V2 is usable, and the path managing means 14 changes the display indicating that the data path 6 is being used to a display indicating that the data path 6 is usable.

In response to the execution designation signal indicating the execution start of the vector store (VST) instruction, the arithmetic operation executing unit 2 reads out the data from the vector register V2 and sends the readout data to the data buffer 32 through the data path 6. When a predetermined time period has elapsed after the VST instruction execution designation is acknowledged, the memory control unit 3 stores the data supplied from the vector register V2 through the data path in the buffer 32. After the VST instruction execution designation is acknowledged, a vector multiplication (VMPY) instruction is set in the instruction register 11.

The decoding/checking circuit 12 checks the use states of the vector registers V2 and V3, having data to be read out by the vector multiplication (VMPY) instruction, and that of the vector register V4, for writing the product.

At this time, the vector register V2, as an object to be processed by the vector multiplication (VMPY) instruction, is being subjected to the read operation by the preceding vector store (VST) instruction. The decoding/checking circuit 12, however, can determine that the vector register V2 is set in a usable state by the resource managing means 13 when a predetermined time period has elapsed. When the resource becomes usable, the circuit 12 sends information indicating execution of the vector multiplication (VMPY) instruction to the arithmetic operation executing unit 2.

According to the present invention, a buffer is held regardless of a busy state of a vector register to be processed by a vector store instruction, and the arithmetic operation executing unit extracts data when a predetermined time period has elapsed after the instruction is issued, thereby releasing the busy state of the vector register to be processed by the vector store (VST) instruction at an early timing. Therefore, when an instruction string is formed such that a vector register to be processed by the VST instruction is supposed to be immediately processed by a subsequent instruction, the subsequent instruction can be issued at an early timing. As a result, although the performance of the individual instruction remains unchanged, an execution time of the processing can be shortened as a whole.

What is claimed is:

1. A system for controlling vector data store execution comprising:
   (A) an arithmetic operation executing means for executing an arithmetic operation on the basis of an instruction and generating an arithmetic operation result;
   (B) a memory means for storing the arithmetic operation result from said arithmetic operation executing means;
   (C) a memory control means, connected to the memory means and the arithmetic operation executing means, for controlling data transfer between said arithmetic operation executing means and said memory means, including:
      (1) a buffer means for receiving data from said arithmetic operation executing means through a data path, for temporarily storing the data, and
      (2) a buffer managing means for managing said buffer means and generating a buffer holding completion response responsive to a buffer holding request,
      said memory control means, in response to a data store instruction, remaining in a standby state until completion of data storage into said buffer means, and then, upon completion of said data storage, checking the state of said memory means and transferring the stored data to said memory means when said checking indicates that said memory means is ready to accept the data transfer; and
   (D) an execution designating means, connected to the memory control means and the arithmetic operation executing means, for designating execution, including:
      (1) a resource managing means for managing a resource used by the arithmetic operation executing means, and indicating a resource use state for the resource, and
      (2) a decoding/checking means for:
         (a) decoding contents of the instruction,
         (b) sending the buffer holding request to said memory control means if the instruction is a data store instruction to memory, regardless of the resource use state,
         (c) receiving the buffer holding completion response, and
         (d) designating execution of the data store instruction to the arithmetic operation executing means and said memory control means if the resource use state indicates that the resource is usable, responsive to the buffer holding completion response.

2. A system according to claim 1, wherein said arithmetic operation executing means includes a vector register whose contents are to be processed by the data store instruction, and said resource managing means manages a use state of said vector register.

3. A system according to claim 1, wherein said arithmetic operation executing means executes a vector arithmetic operation on the basis of a vector instruction.

4. A system according to claim 1, wherein said execution designating means further comprises a path managing means for managing a data path between said arithmetic operation executing means and said memory control means, and indicating a data path use state of the data path, and said decoding/checking means decodes the contents of the instruction, sends a buffer holding request to said memory control means if the instruction is the data store instruction to memory, regardless of the resource use state or the data path use state, and designates execution of the data store instruction to said arithmetic operation executing means and said memory control means if the resource use state and the data path use state indicate that the resource and the data path are usable, responsive to the buffer holding completion response.

5. A system according to claim 4, wherein said decoding/checking means is for decoding the instruction from an instruction register, and for checking the resource use state from said resource managing means and the data path use state from said path managing means.

6. A system for controlling vector data store execution, comprising:

(A) a memory unit, storing data;

(B) an arithmetic operation executing unit, communicating with a plurality of resources including vector registers, operable to execute a vector arithmetic operation including a vector data store, designated by an instruction;

(C) a memory control unit, including:
  (1) a data path linked to the arithmetic operation executing unit and the memory unit;
  (2) a buffer, for temporarily storing data to be transferred between the arithmetic operation executing unit and the memory unit; and
  (3) a buffer managing means for managing the buffer;
said memory control unit, in response to a data store instruction, remaining in a standby state until completion of data storage into said buffer, add then, upon completion of said data storage, checking the state of said memory unit until said checking indicates that said memory unit is ready to accept the data transfer and then transferring the data to said memory unit;

(D) an execution designation control unit including:
  (1) an instruction register, for holding an instruction to be executed;
  (2) a resource managing means, for managing and indicating a resource use state of the resources;
  (3) a path managing means for managing and indicating a data path use state of the data path; and
  (4) a decoding/checking circuit, connected to the memory control unit and the arithmetic operation executing unit, for decoding an instruction, and sending an execution designation signal to the memory control unit and the arithmetic operation executing unit if the resource use state and the data path use state are usable; and (E) if the buffer has a capacity permitting execution of a vector data store instruction, the arithmetic operation executing unit sends data specified by the instruction to the buffer.

7. A system according to claim 6, wherein the arithmetic operation executing unit sends the data to a resource designated by the instruction after a predetermined time period has elapsed.

8. A system according to claim 6, wherein
(1) the decoding/checking circuit informs the resource managing means when a vector register is used, upon sending the execution designation signal, and the resource managing means sets the resource use state of the vector register to currently-being-used, and
(2) the resource managing means sets the resource use state of the vector register to usable after a predetermined time period has elapsed.

9. A system according to claim 6, wherein a next instruction is set in the instruction register after the execution designation signal is sent.

10. A system according to claim 6, wherein:
(1) if the instruction is determined to be a vector data store instruction, the decoding/checking circuit sends a buffer holding request to the buffer managing means;
(2) the instruction register holds the vector data store instruction until the decoding/checking circuit receives a buffer holding response;
(3) responsive to the buffer holding request, the buffer managing means checks the buffer for a capacity permitting execution of the vector data store instruction, and if the capacity is available, the buffer managing means holds the buffer and sends the buffer holding completion response to the decoding/checking circuit;
(4) responsive to the buffer holding completion response, if the indicated resource use state is usable and the indicated data path use state is usable, the decoding/checking circuit sends a vector store instruction execution designation signal to the arithmetic operation execution unit and the memory control unit; and
(5) responsive to the vector store instruction execution designation signal, the arithmetic operation executing unit sends data from the vector register to the buffer.

11. A system according to claim 10, wherein the arithmetic operation executing unit sends the data after a predetermined time period has elapsed.

* * * * *